US007306383B2

(12) United States Patent
Jones et al.

(10) Patent No.: US 7,306,383 B2
(45) Date of Patent: Dec. 11, 2007

(54) COMPOUND DOME WINDOW FOR A SURVEILLANCE CAMERA

(75) Inventors: Theodore L Jones, Akron, PA (US); Richard R Wright, Reinholds, PA (US)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 10/967,856

(22) Filed: Oct. 18, 2004

(65) Prior Publication Data

US 2006/0024046 A1 Feb. 2, 2006

Related U.S. Application Data

(63) Continuation-in-part of application No. 10/900,094, filed on Jul. 27, 2004, now abandoned.

(51) Int. Cl.
*G03B 17/08* (2006.01)
*H04N 5/225* (2006.01)

(52) U.S. Cl. ...................................... 396/427; 348/373

(58) Field of Classification Search .................. 396/25, 396/419, 427; 348/143, 151, 373–375; D16/203

See application file for complete search history.

(56) References Cited

U.S. PATENT DOCUMENTS

| | | | | |
|---|---|---|---|---|
| 3,739,703 A * | 6/1973 | Behles | 396/427 |
| D248,305 S * | 6/1978 | Scott | D16/203 |
| 4,320,949 A | 3/1982 | Pagano | 396/427 |
| 4,705,343 A | 11/1987 | Simons | 359/354 |
| 4,757,204 A | 7/1988 | Baldwin et al. | 250/342 |
| 4,918,473 A | 4/1990 | Blackshear | 396/427 |
| 4,945,367 A | 7/1990 | Blackshear | 396/427 |
| 4,984,089 A | 1/1991 | Stiepel et al. | 348/143 |
| 5,028,997 A * | 7/1991 | Elberbaum | 348/143 |
| 5,111,288 A | 5/1992 | Blackshear | 348/143 |
| 5,368,254 A | 11/1994 | Wickholm | 244/3.16 |
| 5,689,304 A | 11/1997 | Jones et al. | 348/373 |
| D414,504 S | 9/1999 | Madden | D16/203 |
| D424,087 S | 5/2000 | Frick et al. | D16/203 |
| 6,061,087 A | 5/2000 | Schieltz et al. | 348/151 |
| 6,260,309 B1 | 7/2001 | Cliffton | 52/66 |

(Continued)

FOREIGN PATENT DOCUMENTS

CN 1234326 A 11/1999

(Continued)

OTHER PUBLICATIONS

Combined Search and Examination Report filed in related British application No. GB0513281.6, dated Sep. 8, 2005.

*Primary Examiner*—W. B. Perkey
*Assistant Examiner*—Rishi Suthar
(74) *Attorney, Agent, or Firm*—Baker & Daniels LLP

(57) ABSTRACT

A surveillance camera assembly includes a dome window having a substantially cylindrical section with an inner surface and a first annular end. A substantially hemispherical section has a concave surface and a second annular end. The second annular end is joined to the first annular end of the substantially cylindrical section. The concave surface and the inner surface of the substantially cylindrical section conjointly define a cavity. Both the substantially cylindrical section and the substantially hemispherical section are substantially transparent when viewing outwardly from a position within the cavity. A surveillance camera is received in the cavity of the dome window and swivels relative to the dome window.

34 Claims, 13 Drawing Sheets

U.S. PATENT DOCUMENTS

| | | | | |
|---|---|---|---|---|
| 6,268,882 | B1 | 7/2001 | Elberbaum | 348/151 |
| D449,630 | S | 10/2001 | Rak et al. | D16/203 |
| 6,322,258 | B1 | 11/2001 | Ryan et al. | 396/427 |
| D452,696 | S | 1/2002 | Fenton | D16/203 |
| 6,354,749 | B1 * | 3/2002 | Pfaffenberger, II | 396/427 |
| D457,904 | S | 5/2002 | Toste et al. | D16/203 |
| D460,978 | S | 7/2002 | Toste et al. | D16/219 |
| D461,485 | S | 8/2002 | Jones et al. | D16/203 |
| 6,438,816 | B2 | 8/2002 | Wada et al. | 29/428 |
| 6,462,889 | B1 | 10/2002 | Jackson | 359/728 |
| 6,479,813 | B2 | 11/2002 | Takada et al. | |
| 2001/0022617 | A1 | 9/2001 | Bernhardt | 348/373 |

FOREIGN PATENT DOCUMENTS

| | | | |
|---|---|---|---|
| EP | 0234312 | A1 | 9/1987 |
| EP | 0425365 | A1 | 5/1991 |
| EP | 0436797 | A2 | 7/1991 |
| EP | 0616187 | A1 | 9/1994 |
| EP | 1136964 | A2 | 9/2001 |
| EP | 1136965 | A1 | 9/2001 |
| EP | 0 949 050 | A3 | 12/2002 |
| WO | WO 01/99404 | A2 | 12/2001 |
| WO | WO 02/11437 | A2 | 2/2002 |

* cited by examiner

COMPOUND DOME WINDOW FOR A SURVEILLANCE CAMERA

CROSS-REFERENCE TO RELATED APPLICATIONS

The present application is a continuation-in-part of U.S. patent application Ser. No. 10/900,094, filed Jul. 27, 2004 now abandoned.

BACKGROUND OF THE INVENTION

1. Field of the Invention

The present invention relates to dome-style surveillance camera systems and, more particularly, to dome-style surveillance camera systems that can be used outdoors.

2. Description of the Related Art

Surveillance camera systems are commonly used by retail stores, banks, casinos and other organizations to monitor activities within a given area. The cameras are often provided with the capability to pan and tilt in order to acquire images over a wide domain. The tilt of the camera generally refers to the pivoting of the camera about a horizontal axis that is parallel to the floor, such that the lens of the camera may tilt between an upwardly pointing position and a downwardly pointing position. The pan of the camera refers to the rotation of the camera about a vertical axis that is perpendicular to the floor, such that the lens may scan from side to side. The cameras may also be able to zoom in order to reduce or enlarge the field of view. Oftentimes, each camera is linked to video display units in a security surveillance room with surveillance personnel monitoring the multiple video display units.

Surveillance cameras may be mounted within a hemispherical dome window constructed of a material that is transparent when viewing outward and only partially transparent when viewing inward to inhibit unauthorized individuals from determining the area being viewed by the camera. Similarly to sunglasses, the window may be tinted or provided with a thin metallized layer. To further inhibit unauthorized individuals from seeing the position of the camera, the camera is typically encased in a "covert liner", which is generally formed of an opaque matte black material and attached to the pan stage in order to pan with the camera. The covert liner may conform to and be slightly offset from the inside surface of the window. The liner includes a slot through which the camera may view. The slot may extend 90° or more from the apex to the horizon or beyond.

For outdoor applications, the dome window should be of a one-piece, i.e., unitary or monolithic, construction so that there are no seams through which moisture or dirt may pass and thereby possibly contaminate the camera. The dome window is typically formed of a molded plastic material. In order that the plastic dome can be easily removed from the mold without destroying the mold, the inner cavity of the dome should have a width that is constantly increasing, or at least lacking any decrease, along a vertical direction. Thus, the extent of the curvature of the dome window may be limited to 180°, i.e., the curvature of a hemisphere.

The open end of the hemispherical dome window is typically fixedly mounted in a horizontal orientation to some form of overhead mounting apparatus. A tight seal may be provided between the dome window and the overhead mounting apparatus to ensure that no dirt or moisture can enter the dome. Thus, the dome window is typically fixed relative to the overhead mounting apparatus and is not subject to the panning, tilting and zooming movement of the camera contained therein. Consequently, the positioning of the camera via the panning, tilting and zooming may enable the camera to view through any area of the dome window.

In order for the camera to view in horizontal directions without being obstructed by the ceiling or overhead mounting apparatus, the camera is often mounted such that the camera's tilt axis is significantly offset below the geometric center of the hemispherical dome window. The dome window diameter is therefore determined by the camera rotational diameter plus twice the tilt axis offset distance. This larger dome window occupies more space and is more expensive to produce.

With this offset, the line of sight of the camera may be non-perpendicular to the concave inner surface of the dome window at the point where the line of sight intersects the concave inner surface. This may result in refractive distortion of the images received by the camera, particularly in the upper range of camera tilt positions. Increases in offset and dome diameter may worsen the distortion. The refractive distortion may combine with autofocus lens algorithms to result in ghosting, loss of horizontal feature darkness value, and vertical variation of picture quality.

It would be further desirable for the camera to be able to view in directions above the horizon. However, viewing above the horizon would require the tilt axis of the camera to be lowered even farther away from the geometric center of the hemispherical dome window. This would exacerbate problems with refractive distortion. Refractive distortion may be particularly troublesome when viewing in directions above the horizon because the curvature of the dome window slopes slightly outwardly away from the camera.

What is needed in the art is a surveillance camera assembly including a dome window that enables the camera to view in a horizontal direction without obstruction and without requiring the tilt axis of the camera to be positioned below the geometric center of the hemispherical dome window. What is also needed in the art is a surveillance camera assembly including a dome window that enables the camera to view in a slightly upward direction above the horizontal direction.

SUMMARY OF THE INVENTION

The present invention provides a surveillance camera assembly including a fixed compound dome window having a hemispherical section and a cylindrical section. One end of the cylindrical section is connected to the open end of the hemispherical section. The other end of the cylindrical section is coupled to a mounting apparatus. Both the hemispherical section and the cylindrical section are transparent when viewing from the inside of the dome window.

The invention comprises, in one form thereof, a surveillance camera assembly including a dome window having a substantially cylindrical section with an inner surface and a first annular end. A substantially hemispherical section has a concave surface and a second annular end. The second annular end is joined to the first annular end of the substantially cylindrical section. The concave surface and the inner surface of the substantially cylindrical section conjointly define a cavity. Both the substantially cylindrical section and the substantially hemispherical section are substantially transparent when viewing outwardly from a position within the cavity. A surveillance camera is received in the cavity of the dome window and swivels relative to the dome window.

In another form, the invention comprises a surveillance camera assembly including a dome window having a substantially cylindrical section with an inner surface and a first annular end. A substantially hemispherical section has a concave surface and a second annular end. The second annular end is joined to the first annular end of the substantially cylindrical section. The concave surface and the inner surface of the substantially cylindrical section conjointly define a cavity. Both the substantially cylindrical section and the substantially hemispherical section are substantially transparent when viewing outwardly from a position within the cavity. A surveillance camera is received in the cavity of the dome window. The camera swivels about a tilt axis. The tilt axis is substantially coplanar with the second annular end of the hemispherical section of the dome window.

In yet another form, the invention comprises a surveillance camera assembly including a dome window having a substantially cylindrical section with a first annular end. A substantially hemispherical section has a second annular end. The second annular end is joined to the first annular end of the substantially cylindrical section. An inner annular line of demarcation is defined on an inner surface of the dome window between the substantially cylindrical section and the substantially hemispherical section. An outer annular line of demarcation is defined on an outer surface of the dome window between the substantially cylindrical section and the substantially hemispherical section. Both the substantially cylindrical section and the substantially hemispherical section are substantially transparent when viewing outwardly in a direction from the inner surface of the dome window to the outer surface of the dome window. A surveillance camera is received in the dome window. The camera swivels about a tilt axis such that a line of sight of the camera may be aligned with a first point on the inner annular line of demarcation and a second point on the outer annular line of demarcation of the dome window.

An advantage of the present invention is that the camera can view in a horizontal direction without being obstructed by the mounting apparatus and without requiring the tilt axis of the camera to be positioned below the geometric center of the hemispherical section.

Another advantage is that the camera can view in a direction above the horizontal direction without obstruction.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
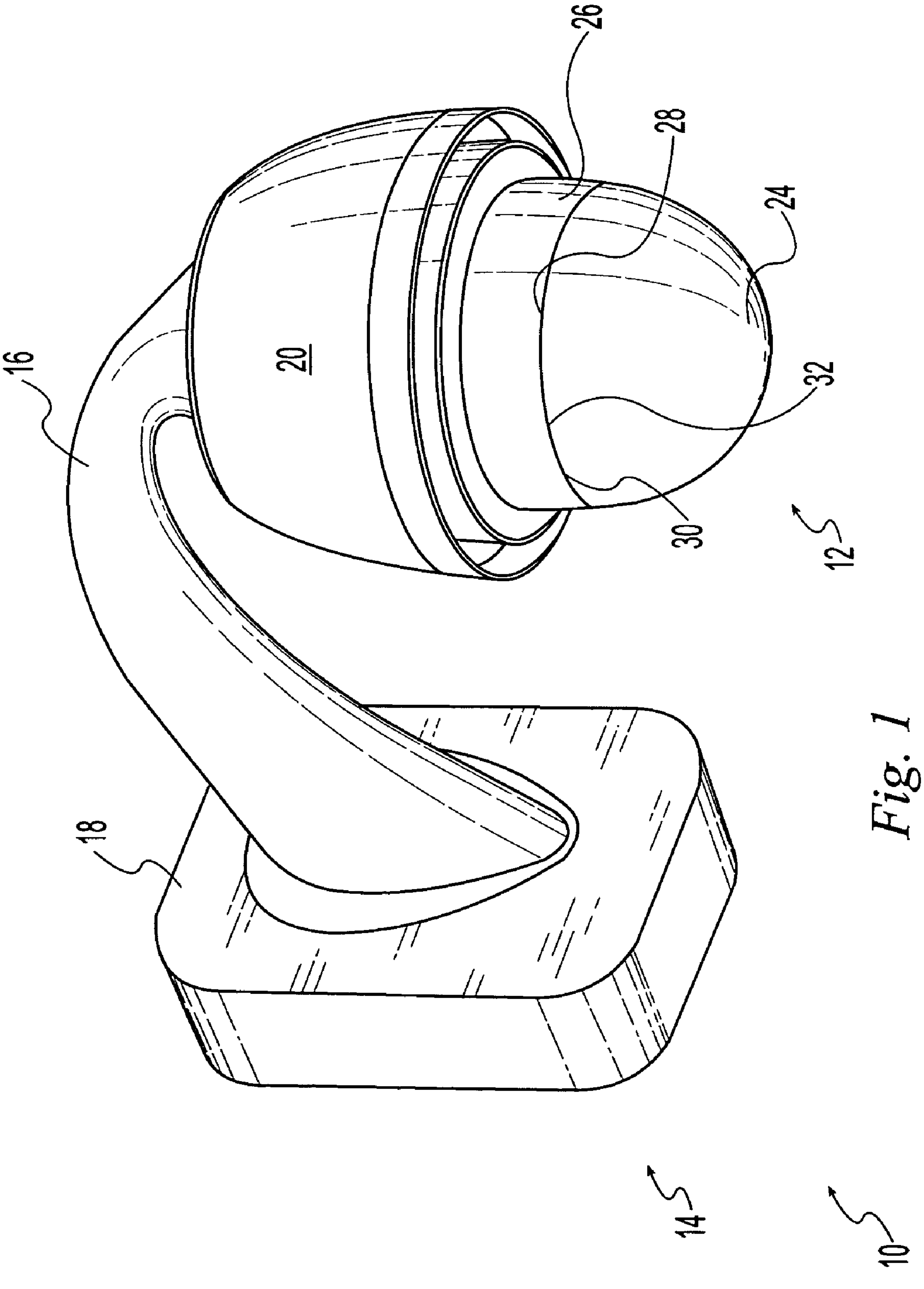
FIG. 1 is a perspective view of one embodiment of a surveillance camera assembly of the present invention.

Corresponding reference characters indicate corresponding parts throughout the several views. Although the exemplifications set out herein illustrate the invention, in one form, the embodiments disclosed below are not intended to be exhaustive or to be construed as limiting the scope of the invention to the precise form disclosed.

DESCRIPTION OF THE PRESENT INVENTION

Referring now to the drawings, and particularly to FIG. 1, there is shown one embodiment of a surveillance camera assembly 10 of the present invention, including a unitary compound dome window 12 coupled to a mounting apparatus 14. Mounting apparatus 14 includes an arm 16 interconnecting a base 18 to a socket 20. Base 18 may be attached to a post, a wall, or some other vertically oriented surface, for example. Socket 20 may include screw holes or slots for allowing dome window 12 to be attached to socket 20. A channel (not shown) may extend through arm 16, base 18 and socket 20 for carrying wires (not shown) therein. The wires may provide electrical power and control signals from a camera monitoring system (not shown) to a surveillance camera 22 (FIG. 2*a*) that is mounted to mounting apparatus 14 within dome window 12. The wires may also carry signals, including video signals, from camera 22 to the camera monitoring system, which may include a video display unit.

Dome window 12 may be constructed of a material that is substantially transparent when viewing outwardly from a position within a cavity 23 of dome window 12. In one embodiment, dome window 12 is formed of an optical quality polycarbonate material.

Window 12 may include a frusto-spherical or spherical cap section 24 and a substantially cylindrical section 26, both of which may have a hardcoat type of coating and/or a finish coating on their outer surfaces. In the embodiment shown, section 24 spans an arc $\theta_1$ of approximately 90° in all directions around a longitudinal axis 42 defined by substantially cylindrical section 26. Thus, section 24 may be approximately hemispherical. Alternatively, arc $\theta_1$ may be less than 90°. An annular end 28 of hemispherical section 24 may be joined to an annular end 30 of cylindrical section 26 at an outer annular line of demarcation 32. Line of demarcation 32 may be visible from outside dome window 12 due to the transition in curvature between hemispherical section 24 and cylindrical section 26, and/or perhaps due to imperfections in the manufacturing process. A concave inner surface 34 of hemispherical section 24 and an inner annular surface 36 of cylindrical section 26 may join together at an inner annular line of demarcation 38. Thus, concave surface 34 and inner surface 36 conjointly define cavity 23. Both outer annular line of demarcation 32 and inner annular line of demarcation 38 may be substantially circular. Moreover, both outer annular line of demarcation 32 and inner annular line of demarcation 38 may be visible from within dome window 12.

Figure 2A:
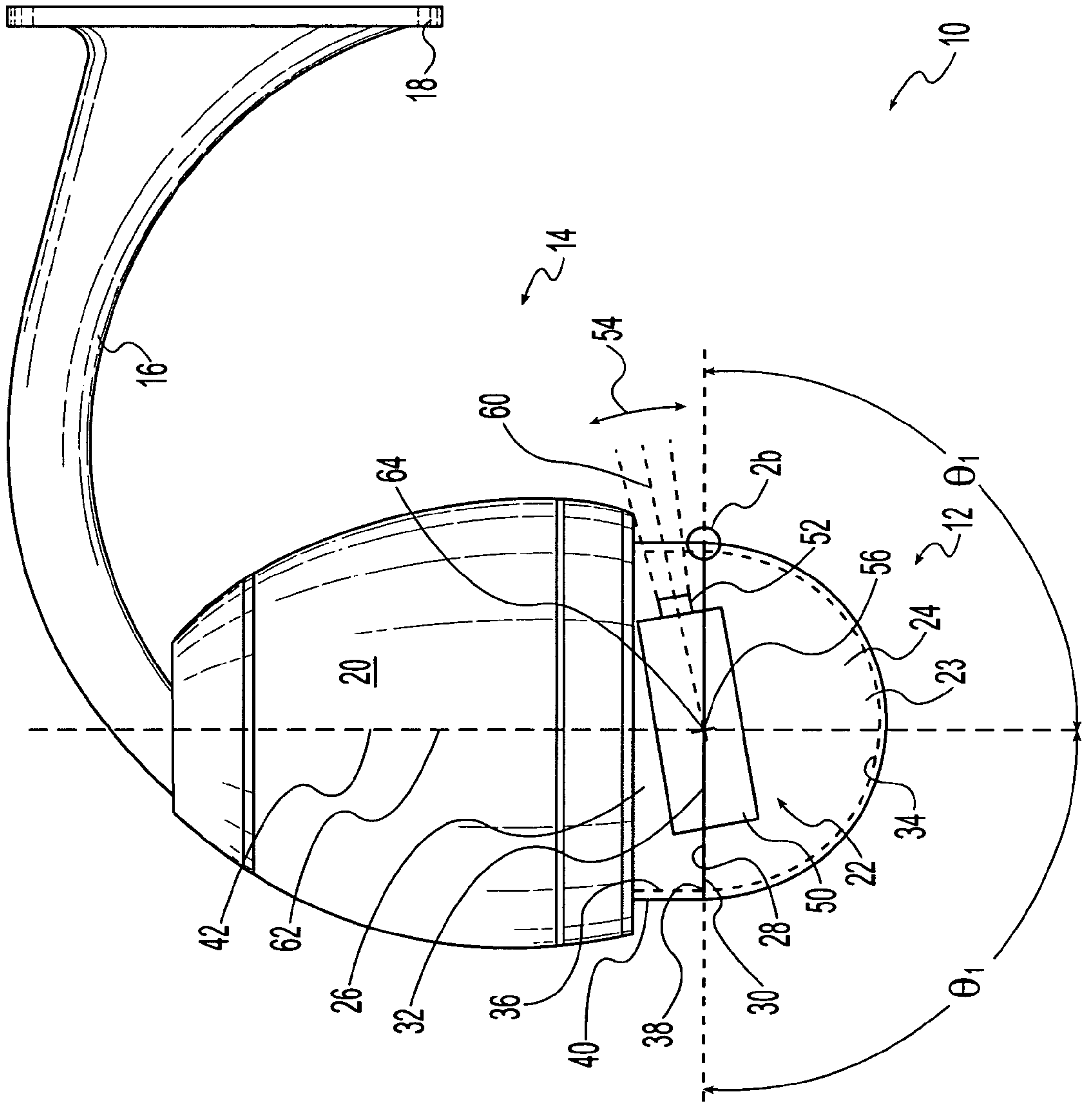
FIG. 2*a* is a side, partially sectional, view of the surveillance camera assembly of FIG. 1.
Figure 2B:
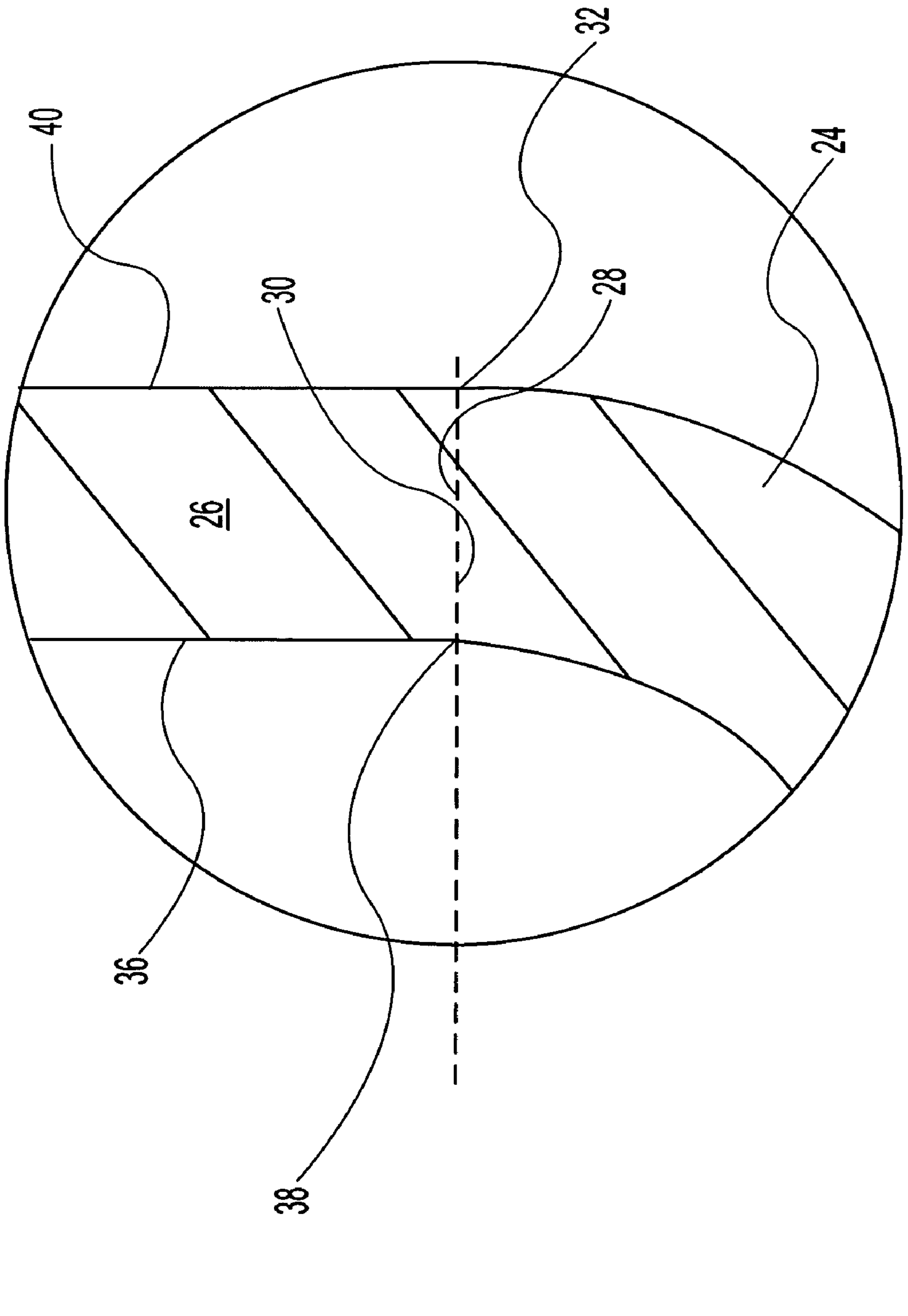
FIG. 2*b* is an enlarged view of the area 2*b* of FIG. 2*a*, providing a sectional view of a portion of the dome window.

The transition between substantially hemispherical section 24 and substantially cylindrical section 26 in circled area 2*b* of FIG. 2*a* is shown in enlarged form in FIG. 2*b*. Both inner surface 36 and an outer surface 40 of substantially cylindrical section 26 may be substantially parallel to longitudinal axis 42.

Figure 2C:
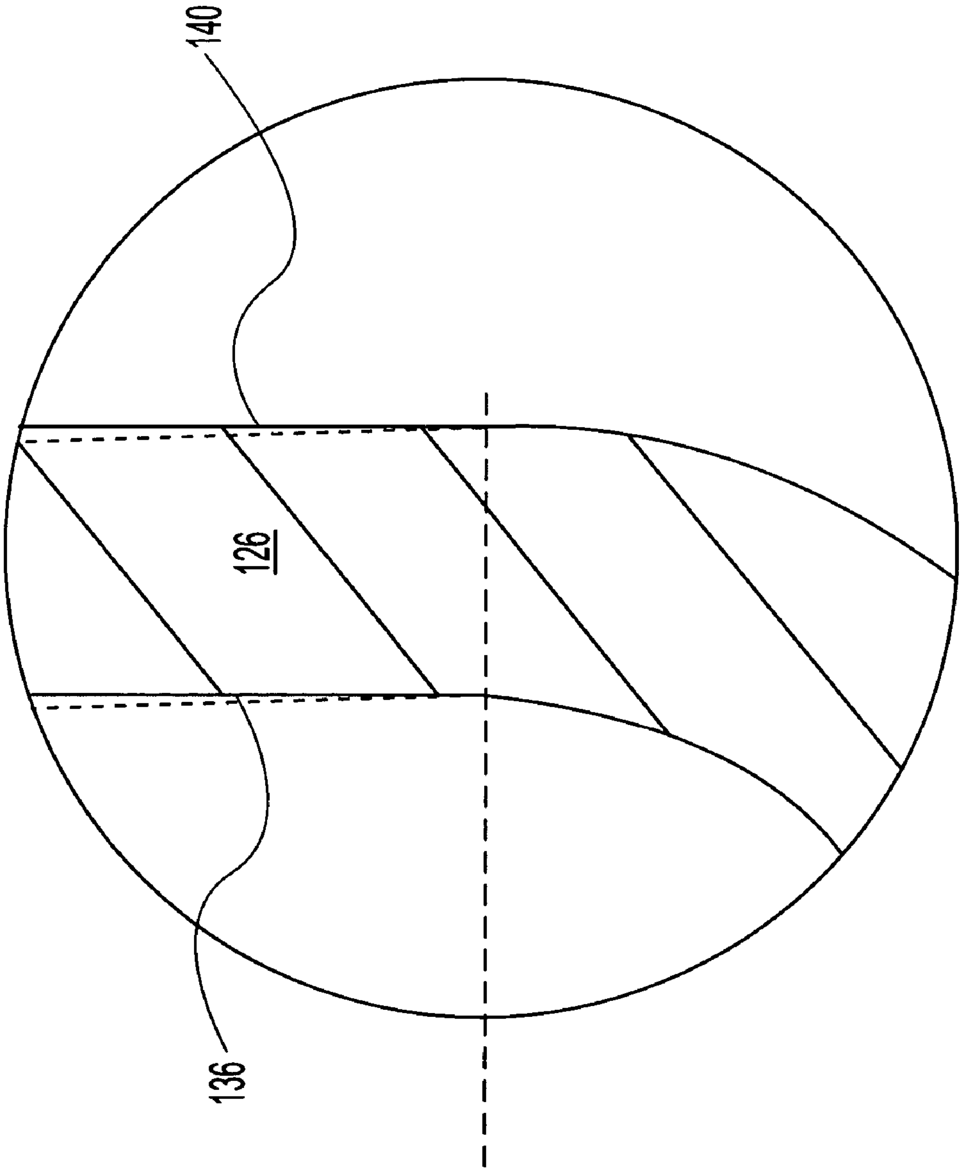
FIG. 2*c* is an enlarged view of the area 2*b* of FIG. 2*a*, providing a sectional view of another embodiment of the portion of the dome window.

In another embodiment, which is indicated in FIG. 2*c*, both an inner surface 136 and an outer surface 140 of a substantially cylindrical section 126 of a dome window are oriented at angles of approximately between 0° and 5° relative to longitudinal axis 42. Thus, in this embodiment, substantially cylindrical section 126 has a frusto-conical shape. Dashed lines that are parallel to longitudinal axis 42 are included in FIG. 2*c* in order to illustrate the slope of surfaces 136, 140. Such an angled orientation of inner surface 136 may ensure that an inner width of the dome window increases in a longitudinal direction along axis 42. Thus, because of the angled orientation of inner surface 136, the dome window may be easier to remove from its mold during manufacture.

Figure 2D:
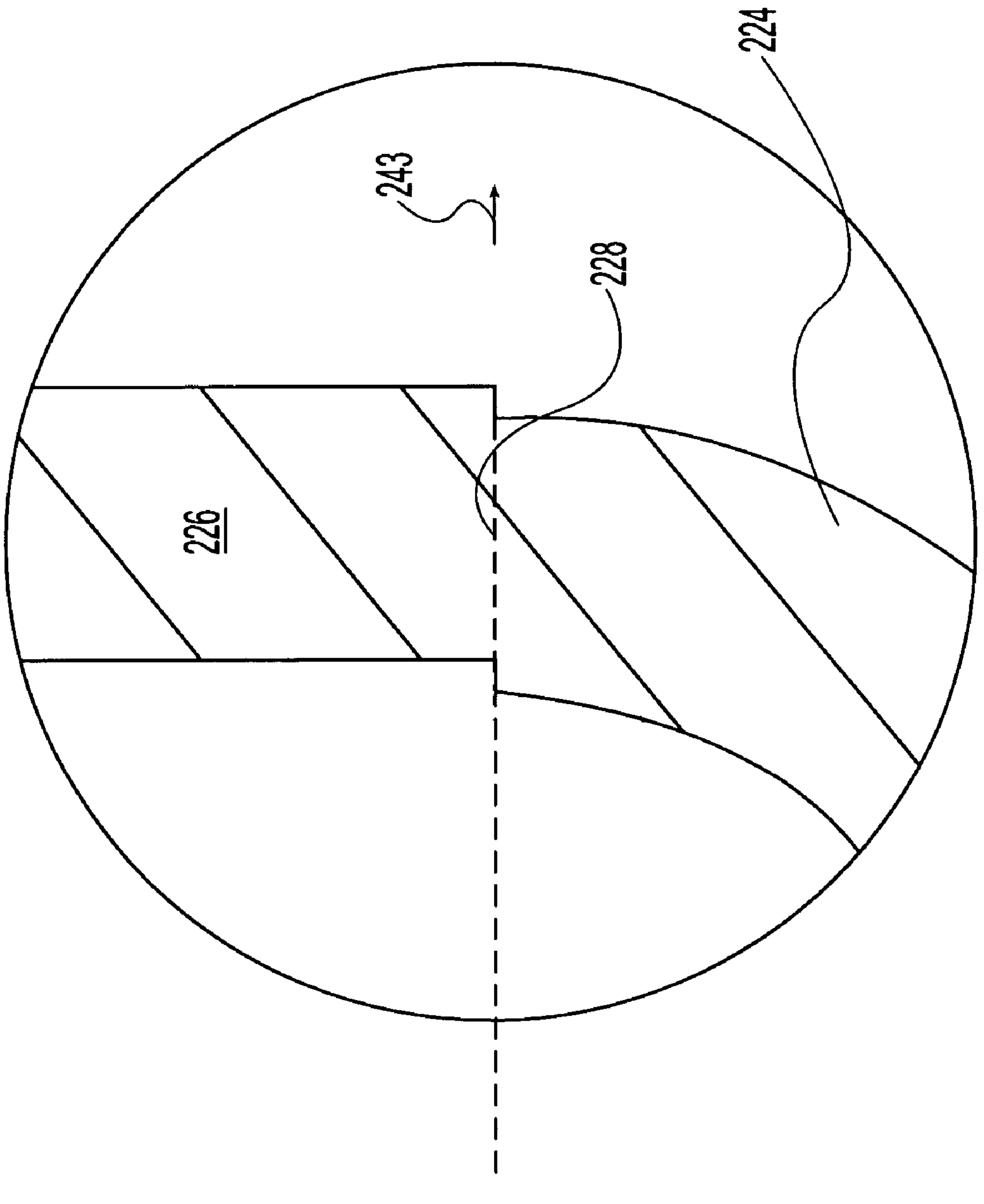
FIG. 2*d* is an enlarged view of the area 2*b* of FIG. 2*a*, providing a sectional view of yet another embodiment of the portion of the dome window.

In yet another embodiment, which is indicated in FIG. 2*d*, a substantially cylindrical section 226 of a dome window has an inner width that is slightly larger than the inner width of an annular end 228 of a substantially hemispherical section 224. Substantially cylindrical section 226 also has an outer width that is slightly larger than the outer width of annular end 228. Thus, as can be seen in FIG. 2*d*, substantially cylindrical section 226 is slightly offset in a radially outward direction 243 from annular end 228 of substantially hemispherical section 224. Such an offset of cylindrical section 226 in radially outward direction 243 may ensure that an inner width of the dome window increases in a longitudinal direction along axis 42. Thus, because of the offset of cylindrical section 226 in radially outward direction 243, the dome window may be easier to remove from its mold during manufacture. Moreover, given that the inner diameter of cylindrical section 226 is greater than the inner diameter of annular end 228, the outer diameter of cylindrical section 226 may also be greater than the outer diameter of annular end 228 to thereby provide cylindrical section 226 and substantially hemispherical section 224 with approximately equal wall widths, which may have optical advantages.

Figure 2E:
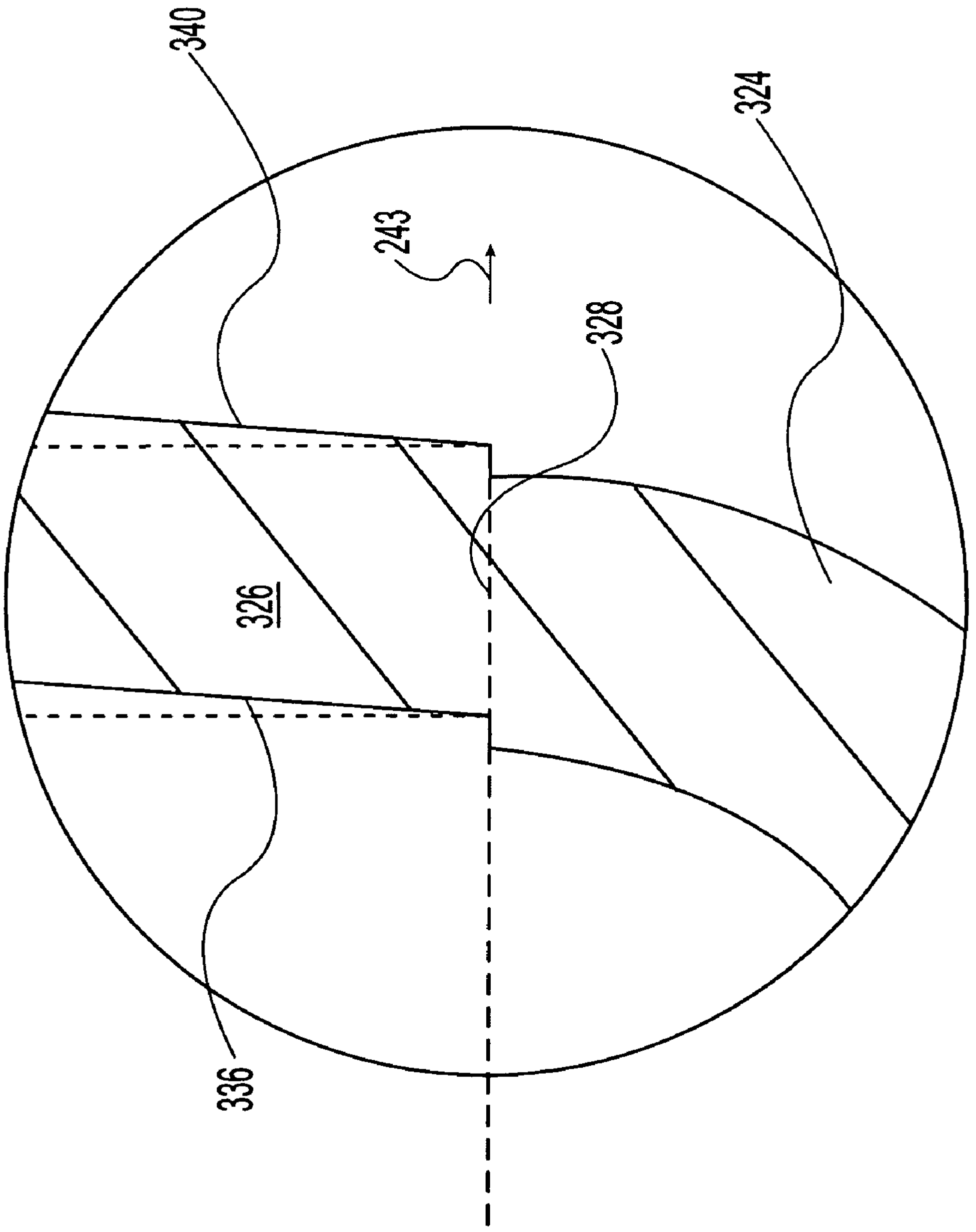
FIG. 2*e* is an enlarged view of the area 2*b* of FIG. 2*a*, providing a sectional view of a further embodiment of the portion of the dome window.

In a further embodiment, which is indicated in FIG. 2*e*, the characteristics of the embodiments of FIGS. 2*c* and 2*d* are combined. More particularly, both an inner surface 336 and an outer surface 340 of a substantially cylindrical section 326 of a dome window are oriented at angles of approximately between 0° and 5° relative to longitudinal axis 42. Thus, in this embodiment, substantially cylindrical section 326 has a frusto-conical shape. Dashed lines that are parallel to longitudinal axis 42 are included in FIG. 2*e* in order to illustrate the slope of surfaces 336, 340. As in the embodiment of FIG. 2*c*, the angled orientation of inner surface 336 may ensure that an inner width of the dome window increases in a longitudinal direction along axis 42. Thus, because of the angled orientation of inner surface 336, the dome window may be easier to remove from its mold during manufacture.

Substantially cylindrical section 326 also has an inner width that is slightly larger than the inner width of an annular end 328 of a substantially hemispherical section 324. Substantially cylindrical section 326 also has an outer width that is slightly larger than the outer width of annular end 328. Thus, as can be seen in FIG. 2*e*, substantially cylindrical section 326 is slightly offset in a radially outward direction 243 from annular end 328 of substantially hemispherical section 324. Such an offset of cylindrical section 326 in radially outward direction 243 may ensure that an inner width of the dome window increases in a longitudinal direction along axis 42. Thus, because of the offset of cylindrical section 326 in radially outward direction 243, the dome window may be easier still to remove from its mold during manufacture.

Figure 3:
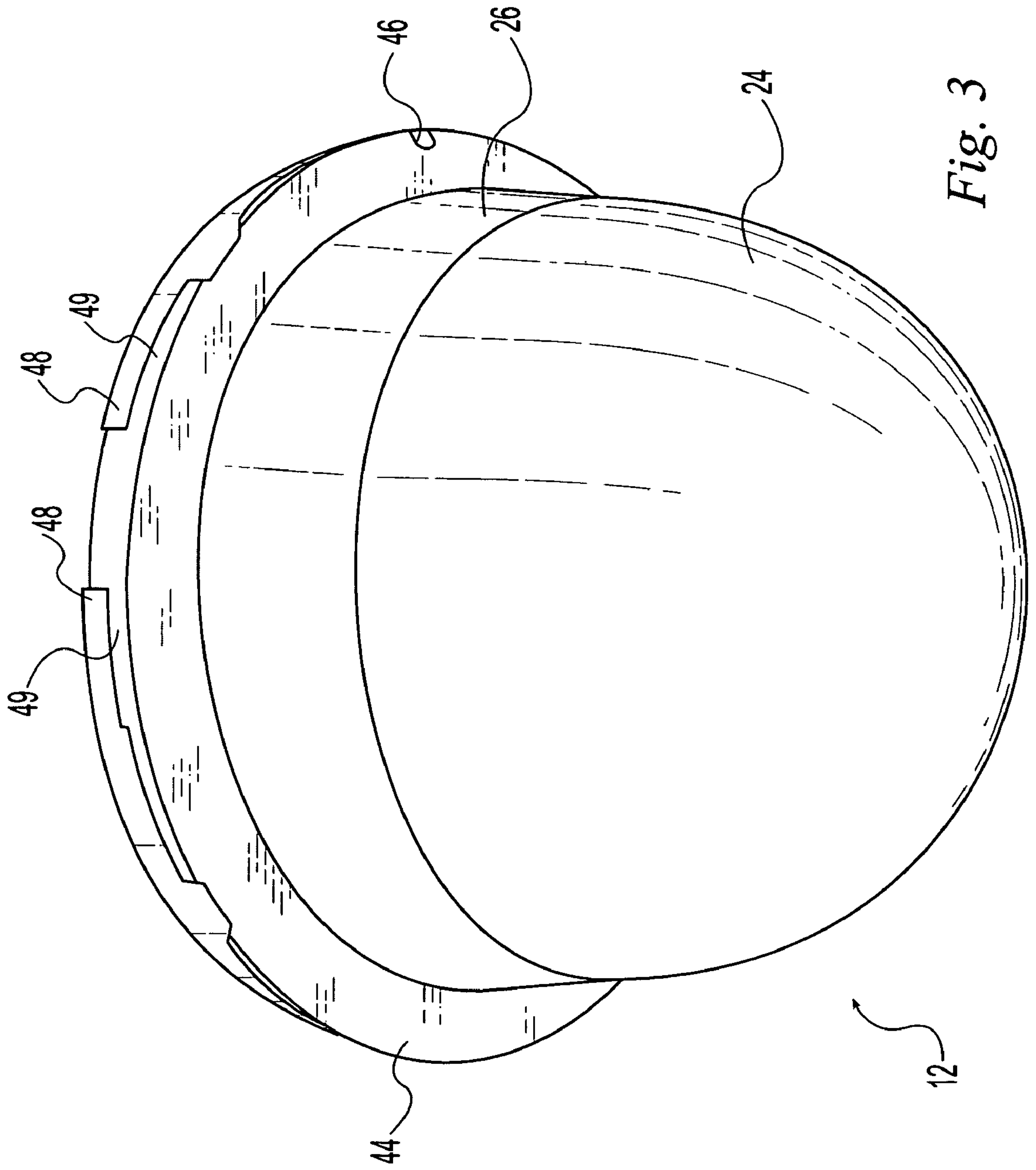
FIG. 3 is a perspective view of the dome window of FIG. 1.

Dome window 12 may include a flange 44, as shown in FIG. 3. Flange 44 may enable dome window 12 to be sealingly coupled to socket 20. For example, flange 44 may have one or more screw holes 46 through which flange 44 can be attached to socket 20 by screws (not shown). Alternatively, flange 44 may include circumferentially oriented projections 48 and/or recesses 49 that can be matingly coupled to corresponding recesses and/or projections (not shown) in socket 20.

Figure 4:
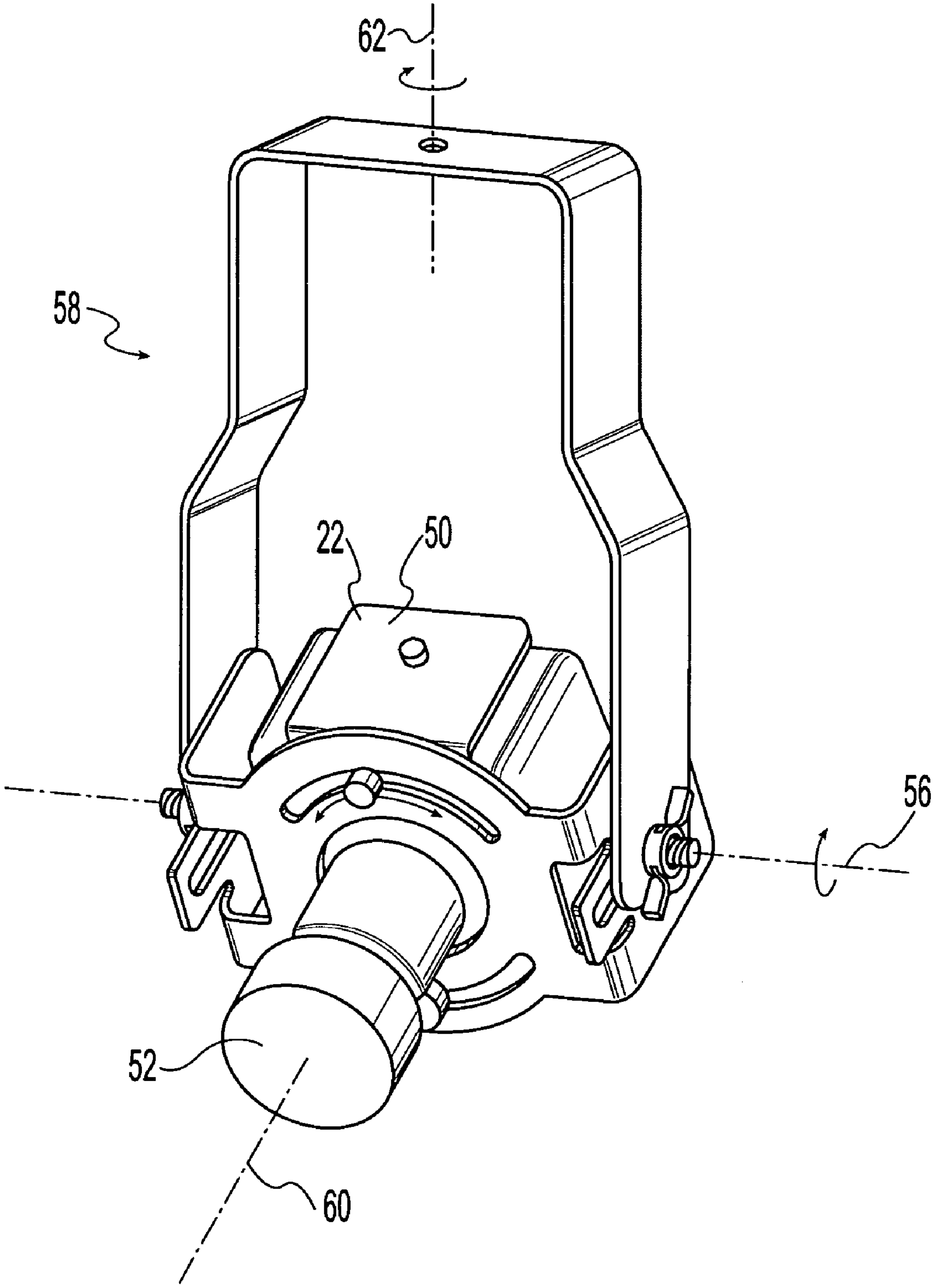
FIG. 4 is a perspective view of the camera of FIG. 2*a* along with one embodiment of a mounting bracket for mounting the camera to the mounting apparatus.

Referring back to FIG. 2*a*, camera 22 may include a camera body 50 and an objective lens 52. Camera 22 may be swiveled or pivoted in directions indicated by double arrow 54 about a horizontally oriented tilt axis 56 extending into the page of FIG. 2*a* and best shown in FIG. 4. Tilt axis 56 may be substantially coplanar with both outer line of demarcation 32 and inner line of demarcation 38. FIG. 4 also illustrates one embodiment of a mounting bracket 58 for mounting camera 22 to socket 20.

In the position shown in FIG. 2*a*, a line of sight 60 of camera 22 is directed above the horizontal direction. That is, camera 22 may view the environment outside of dome window 12 through substantially cylindrical section 26. Camera 22 may also be swiveled or pivoted about a vertically oriented pan axis 62 to thereby scan the line of sight 60 in horizontal directions. In the embodiment of FIG. 2*a*, pan axis 62 is coincident with longitudinal axis 42 and is oriented substantially perpendicular to tilt axis 56.

In the embodiment of FIG. 2*a*, an intersection 64 of tilt axis 56 and pan axis 62 is disposed at a geometric center of hemispherical section 24. That is, intersection 64 is substantially equidistant from substantially all points on concave surface 34. Thus, the distance between objective lens 52 and concave surface 34 along line of sight 60 remains constant throughout the panning and tilting of camera 22 about axes 56, 62. That is, the distance between objective lens 52 and concave surface 34 is independent of the swiveling of camera 22 about axes 56, 62. Further, throughout the panning and tilting of camera 22 about axes 56, 62, line of sight 60 remains oriented substantially perpendicular to concave surface 34 at the point where line of sight 60 intersects concave surface 34. Thus, refractive distortion of the captured video image is reduced.

Line of sight 60 may be aligned with intersection 64 of tilt axis 56 and pan axis 62 such that line of sight 60 is oriented substantially perpendicular to tilt axis 56. Thus, when line of sight 60 is directed horizontally, line of sight 60 may be aligned with both a point on outer line of demarcation 32 and a point on inner line of demarcation 38. With line of sight 60 aligned with both a point on outer line of demarcation 32 and a point on inner line of demarcation 38, inner line 38 may cover or obscure the camera's view of outer line 32. Thus, the combined deleterious optical effect of lines 32, 38 may be reduced.

Camera 22 may also have zoom capabilities that allow the field of view of camera 22 to be either narrowed or widened. In order to adjust the field of view, more than one internal lens element (not shown) may be moved.

During operation, camera 22 tilts, pans and zooms within and relative to the stationary dome window 12. Dome window 12 seals camera 22 from outside elements such as moisture and dirt. Thus, surveillance camera assembly 10 is suitable for installation outdoors where assembly 10 may be exposed to the elements.

When line of sight 60 of camera 22 is generally horizontally directed, the inner and outer lines of demarcation on dome window 12 may be in the field of view of camera 12. However, optical effects of the lines of demarcation may be minimal because the lines of demarcation are out of focus to lens 52. That is, lens 52 effectively "looks past" the lines of demarcation.

During manufacture, dome window 12 can be integrally formed in a mold or "tool" (not shown) that includes a two-piece core and a two-piece cavity. More particularly, both the core and the cavity of the mold may include separate substantially hemispherical and substantially cylindrical portions or "inserts". The substantially hemispherical and substantially cylindrical portions may be polished separately, which may be beneficial if the substantially hemispherical and substantially cylindrical sections of the dome window are to have different optical properties. Thus, the polishing of one of the substantially hemispherical and substantially cylindrical portions of the mold need not affect the polishing of the other of the portions, and there is no uncontrolled transition between the portions. By polishing the substantially hemispherical and substantially cylindrical portions of the mold separately, the optical limitations of polishing the mold as one solid core and/or as one solid cavity may be overcome. Another advantage of using a two-piece mold core and a two-piece mold cavity is that adjustments to the tool may be easier to accomplish.

The lines of demarcation may be accentuated by imperfections in the junctions between the substantially hemispherical and substantially cylindrical portions of the mold. Thus, in order to reduce the prominence of the lines of demarcation, it may be desirable for the edges of the substantially hemispherical and substantially cylindrical portions of the mold to be as sharp and precisely aligned with each other as possible.

In another embodiment (FIG. 5*a*), a surveillance camera assembly 410 includes a dome window 412 having a substantially hemispherical, frusto-spherical or spherical cap section 424 and a substantially cylindrical section 426. In this embodiment, section 424 spans an arc $\theta_1$ of approximately 88° in all directions around a longitudinal axis 442 defined by substantially cylindrical section 426. Thus, arc $\theta_1$ is approximately 2° short of section 424 being hemispherical.

In one embodiment, an inner radius 466 between a geometric center 468 of frusto-spherical section 424 and a concave surface 434 of section 424 is 73.5 millimeters, and an outer radius 470 between geometric center 468 and an outer surface 472 of section 424 is 76.0 millimeters. Thus, a thickness of section 424 may be approximately 2.5 millimeters.

An intersection 464 of a pan axis 462 and a tilt axis 456 of a camera 422 may be vertically offset from geometric center 468. This vertical offset has the advantage that camera 422 may view in a horizontal direction without obstruction from an outer line of demarcation 432 and an inner line of demarcation 438. Moreover, camera 422 may still view out through substantially cylindrical section 426. In one embodiment, a vertical offset 474 between intersection 464 and geometric center 468 is 11.5 millimeters, which may be approximately one-half of a diameter 476 of an objective lens 452 of camera 422.

Dome window 412 includes a flange 444 having circumferential projections 448 and a circumferential recess 449 for matingly coupling dome window 412 to corresponding recesses and projections (not shown) on the mounting apparatus.

Figure 5A:
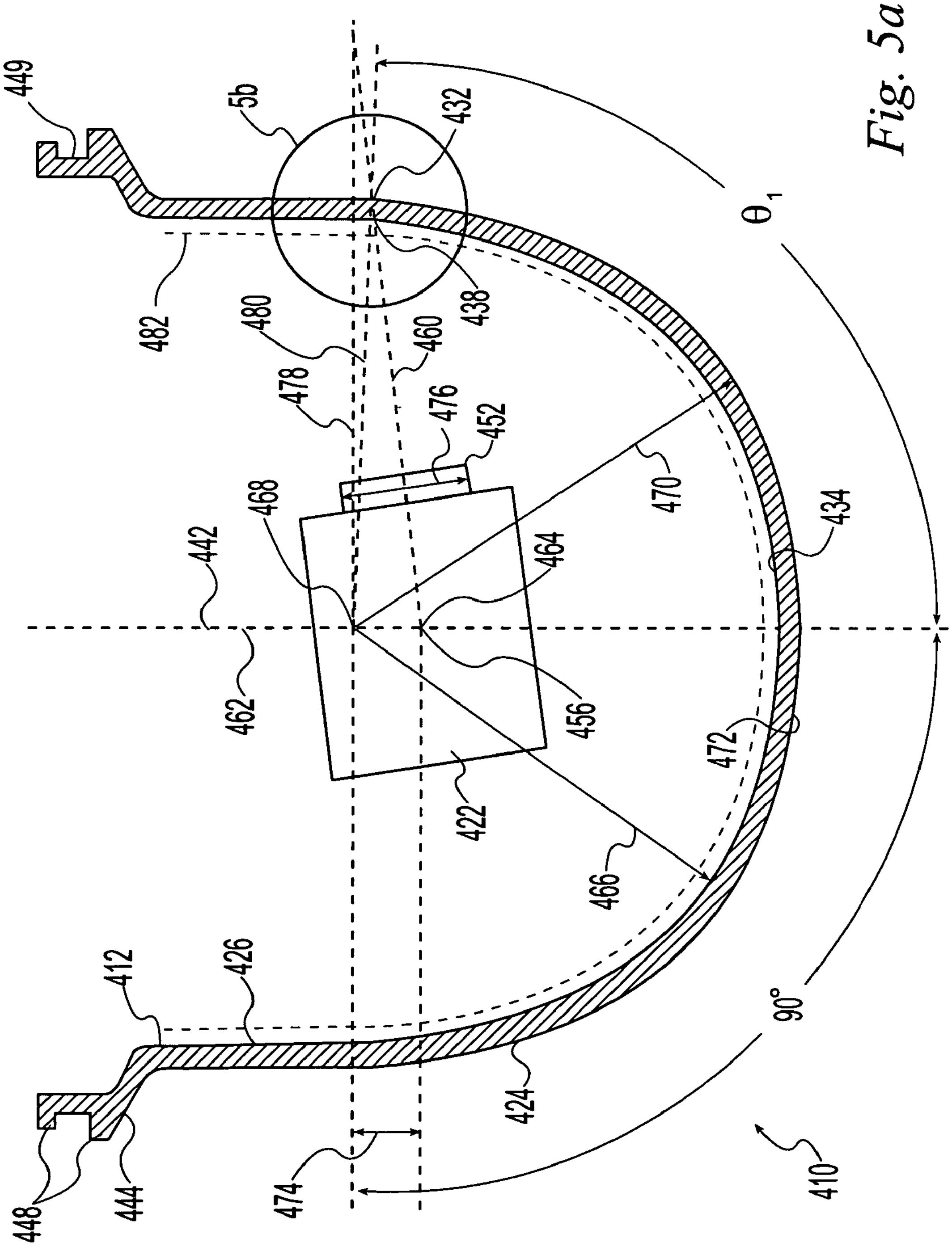
FIG. 5*a* is a cross-sectional view of another embodiment of a surveillance camera assembly of the present invention.
Figure 5B:
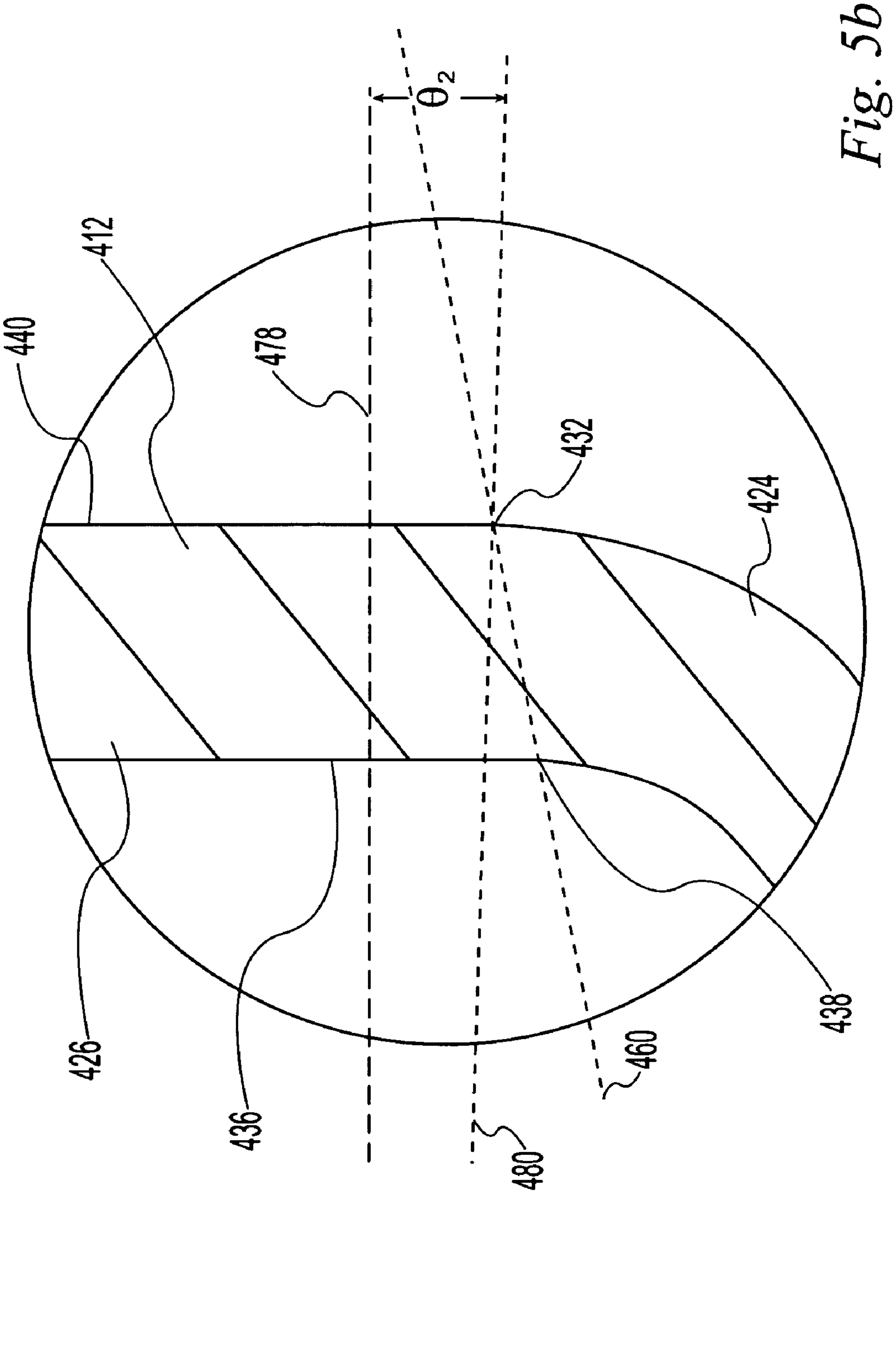
FIG. 5*b* is an enlarged view of the area 5*b* of FIG. 5*a*, providing a sectional view of a portion of the dome window.

The transition between frusto-spherical section 424 and substantially cylindrical section 426 in circled area 5*b* of FIG. 5*a* is shown in enlarged form in FIG. 5*b*. A horizontal dashed line 478 extends through geometric center 468. Another dashed line 480 extends between geometric center 468 and outer line of demarcation 432. An angle $\theta_2$ defined between dashed lines 478 and 480 is a complement of angle $\theta_1$. That is, $\theta_2=90°-\theta_1$. Thus, in the embodiment wherein angle $\theta_1$ equals 88°, angle $\theta_2$ equals 2°.

An inner surface 436 of substantially cylindrical section 426 may extend downwardly to a different vertical level than does an outer surface 440 of substantially cylindrical section 426. Moreover, an angle between dashed line 478 and another dashed line (not shown) extending between geometric center 468 and inner line of demarcation 438 may be unequal to angle $\theta_2$. This characteristic makes possible an arrangement wherein line of sight 460 is aligned with both inner line of demarcation 438 and outer line of demarcation 432. Thus, the vertical offset between intersection 464 and geometric center 468 can be set such that inner line 438 at least partially covers or obscures the camera's view of outer line 432. Thus, as in previously discussed embodiments, the combined deleterious optical effect of lines 432, 438 may be reduced. In one embodiment, the height of an optical discontinuity that is due to lines 432, 438 is no greater than 0.10 millimeter in the direction of line of sight 460.

Surveillance camera assembly 410 may include a covert liner 482, which is described in detail below. Other aspects of surveillance camera assembly 410 are substantially similar to those of surveillance camera assembly 10, and thus are not discussed in detail herein.

In another embodiment (not shown), the intersection of the pan axis and the tilt axis may be disposed above the geometric center of the frusto-spherical section of the dome window. This embodiment retains many of the same advantages that are discussed above.

Figure 5C:
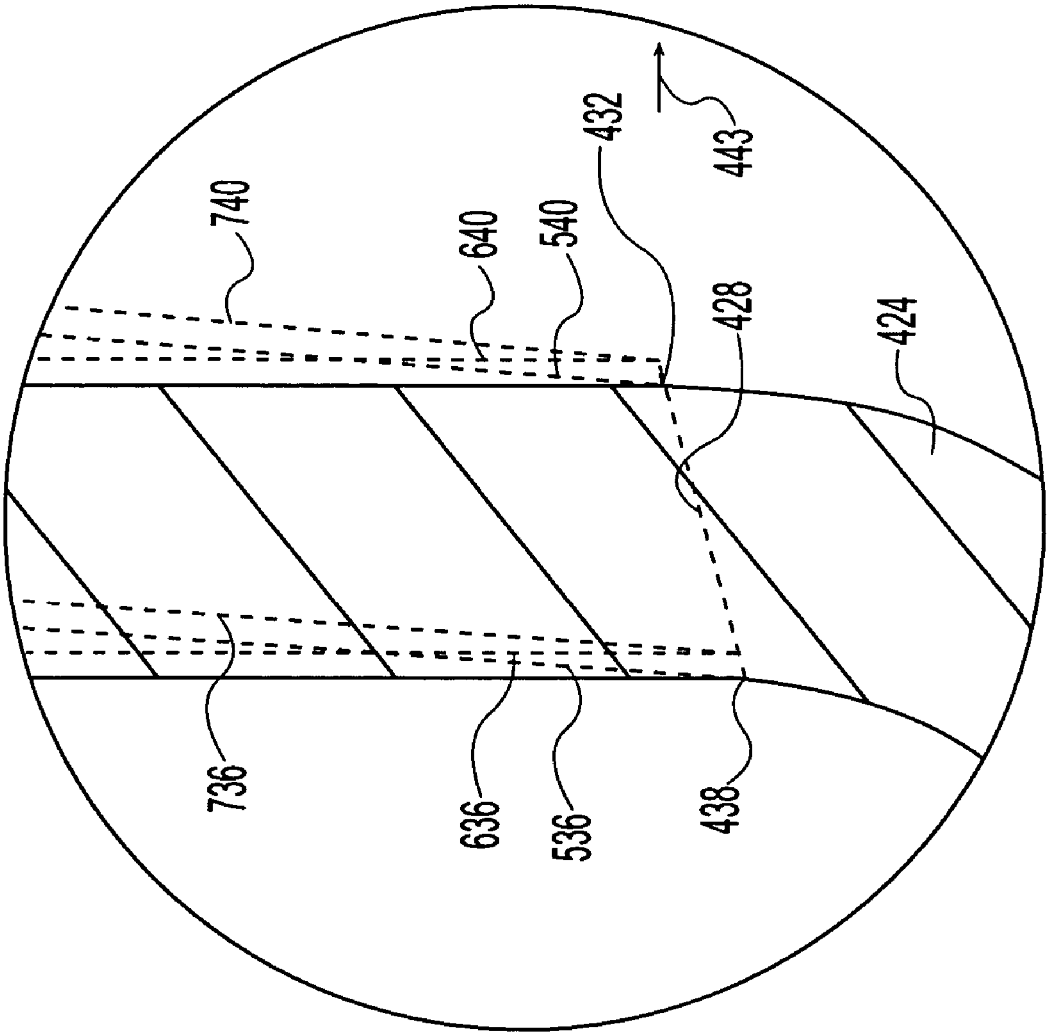
FIG. 5*c* is another enlarged view of the area 5*b* of FIG. 5*a*, illustrating alternative embodiments of the dome window.

Substantially cylindrical section 426 may include modifications similar to the modifications of substantially cylindrical section 26 that are illustrated in FIGS. 2*c* through 2*e*. More particularly, as illustrated in FIG. 5*c*, the substantially cylindrical section may include an inner surface 536 and an outer surface 540 that are oriented at angles of approximately between 0° and 5° relative to longitudinal axis 442. Thus, in this embodiment, the substantially cylindrical section has a frusto-conical shape. Such an angled orientation of inner surface 536 may ensure that an inner width of the dome window increases in a longitudinal direction along axis 442. Thus, because of the angled orientation of inner surface 536, the dome window may be easier to remove from its mold during manufacture.

In yet another embodiment, the substantially cylindrical section has an inner width that is defined by an inner surface 636. The inner width of the substantially cylindrical section is slightly larger than the inner width of an annular end 428 of frusto-spherical section 424. The substantially cylindrical section also has an outer width that is defined by an outer surface 640. The outer width is slightly larger than the outer width of annular end 428 of frusto-spherical section 424. Thus, as can be seen in FIG. 5*c*, the substantially cylindrical section may be slightly offset in a radially outward direction 443 from annular end 428 of substantially hemispherical section 424. Such an offset of cylindrical section 226 in radially outward direction 443 may ensure that an inner width of the dome window increases in a longitudinal direction along axis 442. Thus, because of the offset of the cylindrical section in radially outward direction 443, the dome window may be easier to remove from its mold during manufacture.

In a further embodiment, the characteristics of the previous two embodiments are combined. More particularly, both an inner surface 736 and an outer surface 740 of the substantially cylindrical section are oriented at angles of approximately between 0° and 5° relative to longitudinal axis 442. Moreover, the substantially cylindrical section is slightly offset in a radially outward direction 443 from annular end 428 of frusto-spherical section 424. Because of the angled orientation of inner surface 736, and because of the offset of the cylindrical section in radially outward direction 443, the dome window may be easier still to remove from its mold during manufacture.

Figure 6C:
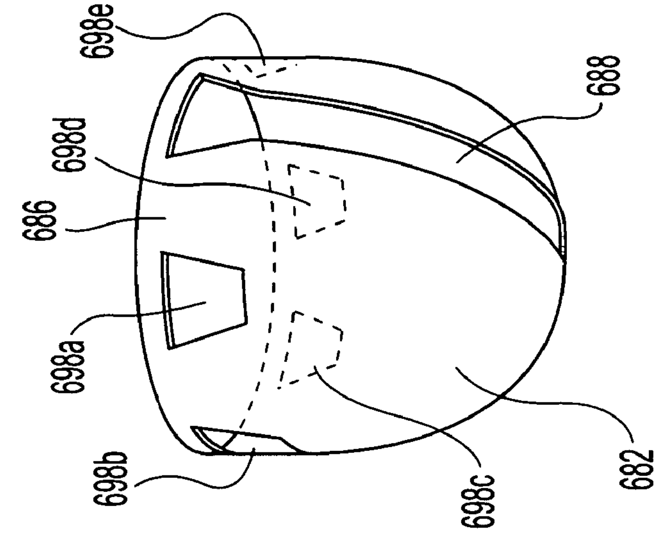
FIG. 6*c* is a perspective view of yet another embodiment of the covert liner of the surveillance camera assembly of FIG. 5*a*.
Figure 6B:
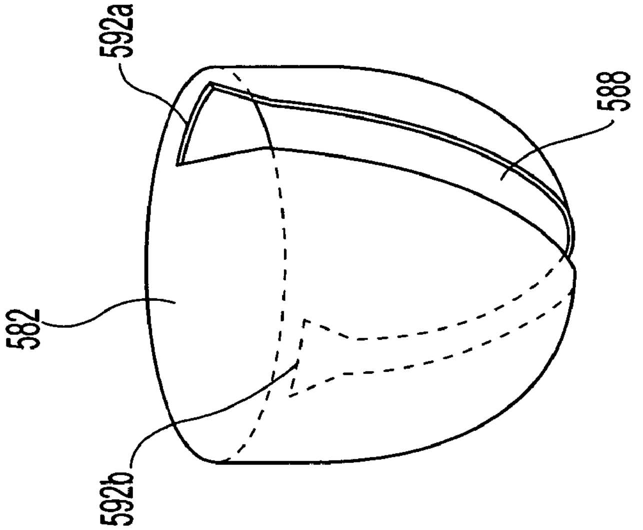
FIG. 6*b* is a perspective view of another embodiment of the covert liner of the surveillance camera assembly of FIG. 5*a;*
Figure 6A:
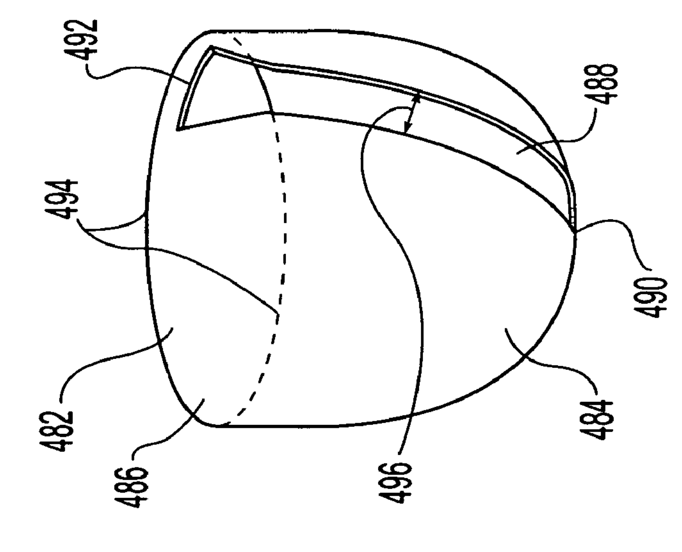
FIG. 6*a* is a perspective view of one embodiment of the covert liner of the surveillance camera assembly of FIG. 5*a;*

Covert liner 482, which is shown in more detail in FIG. 6*a*, may be formed of an opaque matte black material. As illustrated in FIG. 5*a*, liner 482 conforms to and is disposed adjacent to the inner surface of dome window 412, and thus liner 482 has a shape substantially similar to that of window 412. Liner 482 includes a substantially hemispherical section 484 associated with substantially hemispherical section 424 of dome window 412, and a substantially cylindrical section 486 associated with substantially cylindrical section 426 of dome window 412.

Liner 482 may include a throughslot 488 through which camera 422 may view. Throughslot 488 may have a first end 490 at an apex of liner 482, and a second opposite end 492 adjacent an annular end 494 of liner 482. End 492 may be disposed at an angle of up to 20° above horizontal dashed line 478 (see FIG. 5*a*) relative to geometric center 468. Slot 488 may have a constant width 496 generally within substantially hemispherical section 484. Within substantially cylindrical section 486, slot 488 may have a variable width which increases as end 492 is approached. The varying-width portion of slot 488 may extend to the bottom of cylindrical section 486, and may extend slightly into hemispherical section 484. In one embodiment, constant width 496 is approximately 44 millimeters, and the width of slot 488 at end 492 is approximately 52 millimeters.

The width of the throughslot 488 is desirably minimized so that a backlit silhouette of liner 482 appears to be the same when viewed from every angle. However, the width of throughslot 488 is also desirably large enough that the conical field of view of camera 422 is not obstructed by liner 482. Liner 482 may be attached to the panning mechanism such that slot 488 follows the panning of camera 422. As line of sight 460 tilts above the horizon, the distance between objective lens 452 and liner 482 increases, and thus the width of the conical field of view of camera 422 where it passes through slot 488 also increases. The increasing width of slot 488 near end 492 accommodates the larger field of view when line of sight 460 is above the horizon. That is, the width of slot 488 is at least as large as the corresponding width of the field of view such that the view of camera 422 is not obstructed by liner 482.

In another embodiment, shown in FIG. 6*b*, a covert liner 582 includes a throughslot 588 that is symmetrical about the apex of liner 582. Thus, slot 588 includes two prongs extending from the apex, both of which prongs may be substantially similar to slot 488. Slot 588 may extend over an arc of approximately 220° between opposite ends 592*a* and 592*b*. Slot 588 enables camera 422 to provide seamless, uninterrupted coverage of a subject passing below the surveillance camera assembly. Slot 588 enables camera 422 to avoid a 180° pan motion which may briefly interrupt the video and produce an acoustical sound that could draw attention to the camera.

In yet another embodiment, shown in FIG. 6*c*, a covert liner 682 includes a throughslot 688 that may be substantially similar to throughslot 488. The increased width of slot 688 in substantially cylindrical section 686 may result in a variation in the perceived diameter of substantially cylindrical section 686 from different viewing angles. In order to make it more difficult for an onlooker to deduce the panning direction of the camera from the perceived diameter variation, liner 682 includes additional throughholes 698*a-e* evenly spaced around substantially cylindrical section 686. As shown, each of throughholes 698*a-e* may have a shape that is similar to the shape of the variable-width portion of slot 688. Thus, an onlooker may not easily discern whether he is looking at the variable-width portion of slot 688 or one of throughholes 698*a-e*. The presence of throughholes 698*a-e* makes the camera position less perceivable and predictable and therefore more covert for concealing the direction of camera 422.

Covert liners 482, 582 and 682 have been described herein as being included in surveillance camera assembly 410. However, any of liners 482, 582 and 682 may also, and just as readily, be included in surveillance camera assembly 10.

Figure 7:
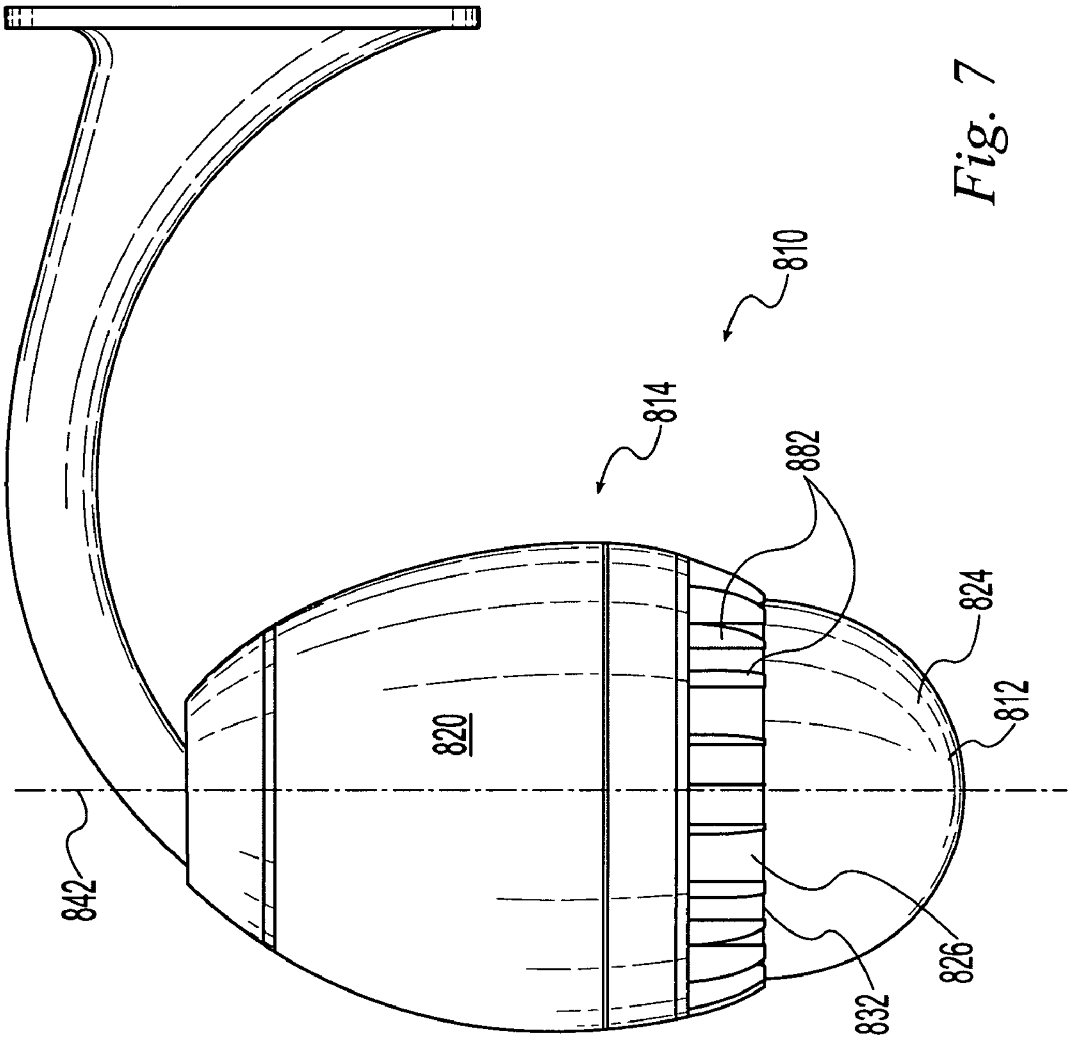
FIG. 7 is a side view of another embodiment of a surveillance camera assembly of the present invention.

In another embodiment, illustrated in FIG. 7, a surveillance camera assembly 810 includes a mounting apparatus 814 having a plurality of fins 882 extending downwardly from a socket 820. Fins 882 may be arranged around a perimeter of a substantially cylindrical section 826 of a dome window 812. In the embodiment shown, fins 882 extend down slightly past an outer line of demarcation 832 between substantially cylindrical section 826 and a substantially hemispherical section 824. Each of fins 882 may have a substantially planar shape, and may be oriented parallel to a longitudinal direction 842 defined by substantially cylindrical section 826. Further, each of fins 882 may be oriented radially from longitudinal direction 842. The radially outward orientation of fins 882 permits the camera to view outwardly through substantially cylindrical section 826 and between fins 882 with minimal obstruction. In addition to being very thin so as to reduce optical interference, fins 882 may be formed of a flexible material so as to avoid damage from mechanical handling.

Fins 882 provide the surveillance camera assembly with distinct advantages. For example, fins 882 may shield the camera from the glare of the sun, particularly when the camera is viewing in a direction above the horizon, i.e., above a horizontal direction.

Other aspects of surveillance camera assembly 810 are substantially similar to those of surveillance camera assemblies 10 and 410, and thus are not discussed in detail herein.

The dome window has been described herein as being unitary, i.e., monolithic or integral, meaning that the dome window is of one-piece construction without any joints or seams. Such joints or seams could degrade the optical properties of the dome window and/or allow moisture and dirt to enter into the dome window. However, it is to be understood that it is also possible within the scope of the present invention for the dome window to be formed of two or more pieces that are bonded together, such as by adhesive. For example, the annular end of the frusto-spherical section of the dome window could be bonded to the annular end of the substantially cylindrical section of the dome window. In this case, the bonded ends would form the annular line of demarcation.

The dome window has been described herein as being used in conjunction with a PTZ camera. However, the dome window may also be used in conjunction with a fixed camera that has a fixed line of sight. For example, such a fixed camera may be manually zoomed and focused, and semi-permanently positioned on a fixed gimbal mechanism. The light of sight of the fixed camera may be directed above the horizon such that the camera continuously views through the substantially cylindrical section of the dome window. Alternatively, the light of sight of the fixed camera may be directed below the horizon such that the camera continuously views through the substantially hemispherical section of the dome window.

While this invention has been described as having an exemplary design, the present invention may be further modified within the spirit and scope of this disclosure. This application is therefore intended to cover any variations, uses, or adaptations of the invention using its general principles.

What is claimed is:

1. A surveillance camera assembly, comprising:

a dome window including:

a substantially cylindrical section having an inner surface with a first annular end, said inner surface having a first diameter at said first annular end and a second diameter at a location on said inner surface spaced from said first annular end, said second diameter greater than said first diameter wherein said inner surface has a frusto-conical shape; and a substantially hemispherical section having a concave surface and a second annular end, said second annular end being joined to said first annular end of said substantially cylindrical section, said concave surface and said inner surface of said substantially cylindrical section conjointly defining a cavity, both said substantially cylindrical section and said substantially hemispherical section being substantially transparent when viewing outwardly from a position within said cavity; and a surveillance camera received in the cavity of said dome window and configured to swivel relative to said dome window and to view through each of said substantially hemispherical and substantially cylindrical sections of said dome window.

2. The camera assembly of claim 1 wherein said camera includes an objective lens, said camera being configured to swivel about both a tilt axis and a pan axis, the pan axis being substantially perpendicular to the tilt axis, a distance between said objective lens and said concave surface of said substantially hemispherical section of said dome window being independent of the swiveling about the tilt axis and the pan axis.

3. The camera assembly of claim 1 wherein said camera is configured to swivel about both a tilt axis and a pan axis having an intersection with the tilt axis, the intersection being substantially equidistant from substantially all points on the concave surface of said substantially hemispherical section of said dome window.

4. The camera assembly of claim 1 wherein said camera is configured to swivel about both a tilt axis and a pan axis, the pan axis being substantially perpendicular to the tilt axis, a line of sight of said camera remaining substantially normal to said substantially hemispherical section of said dome window at an intersection of the line of sight and said substantially hemispherical section throughout the swiveling about the tilt axis and the pan axis.

5. The camera assembly of claim 1 wherein said substantially cylindrical section of said dome window further comprises an outer surface, said outer surface having a first diameter at said first annular end and a second diameter at a location on said outer surface spaced from said first annular end, said second diameter greater than said first diameter, wherein said outer surface has a frusto-conical shape.

6. The camera assembly of claim 1 wherein said first annular end of said substantially cylindrical section has a first inner diameter that is greater than a second inner diameter of said second annular end of said substantially hemispherical section.

7. The camera assembly of claim 6 wherein said first annular end of said substantially cylindrical section has a first outer diameter that is greater than a second outer diameter of said second annular end of said substantially hemispherical section.

8. The camera assembly of claim 1 wherein said camera is mountable within said dome window.

9. The camera assembly of claim 1 further comprising a mounting apparatus, said camera being mounted to said mounting apparatus.

10. The camera assembly of claim 9 wherein said dome window is coupled to said mounting apparatus.

11. The camera assembly of claim 10 wherein said substantially cylindrical section of said dome window defines a longitudinal direction, said mounting apparatus including a plurality of fins arranged around a perimeter of said substantially cylindrical section, each of said fins being oriented radially and parallel relative to the longitudinal direction.

12. The camera assembly of claim 9 wherein said dome window includes a flange coupled to said mounting apparatus.

13. The camera assembly of claim 1 wherein said substantially cylindrical section defines a longitudinal direction, said camera including an objective lens, a tilt axis of said camera being offset from a geometric center of said substantially hemispherical section by a distance equal to approximately one-half of a diameter of said objective lens.

14. The camera assembly of claim 1 wherein said dome window is unitary.

15. The camera assembly of claim 1 further comprising a covert liner disposed adjacent said inner surface of said substantially cylindrical section and said concave surface of said substantially hemispherical section of said dome window, said covert liner including a substantially hemispherical section associated with said substantially hemispherical section of said dome window, said covert liner also including a substantially cylindrical section associated with said substantially cylindrical section of said dome window.

16. The camera assembly of claim 15 wherein said covert liner includes a throughslot having a variable width in said substantially cylindrical section of said covert liner.

17. A surveillance camera assembly, comprising:

a dome window including:

a substantially cylindrical section having a longitudinal axis and a first annular end; and a substantially hemispherical section having a second annular end, said second annular end being joined to said first annular end of said substantially cylindrical section, an inner annular line of demarcation being defined on an inner surface of said dome window at an intersection between said substantially cylindrical section and said substantially hemispherical section, an outer annular line of demarcation being defined on an outer surface of said dome window at an intersection between said substantially cylindrical section and said substantially hemispherical section, said inner and outer annular lines of demarcation perpendicular to, and disposed at differing vertical levels with respect to, said longitudinal axis, both said substantially cylindrical section and said substantially hemispherical section being substantially transparent when viewing outwardly in a direction from said inner surface of said dome window to said outer surface of said dome window; and a surveillance camera received in said dome window, said camera being configured to view through each of said substantially hemispherical and substantially cylindrical sections of said dome window, and to swivel about a tilt axis such that a line of sight of said camera may be aligned with a first point on the inner annular line of demarcation and a second point on the outer annular line of demarcation of said dome window.

18. The camera assembly of claim 17 wherein the tilt axis of said camera is substantially coplanar with the inner annular line of demarcation and the outer annular line of demarcation of said dome window.

19. The camera assembly of claim 17 wherein said camera includes an objective lens, said camera being configured to swivel about a pan axis substantially perpendicular to the tilt axis, a distance between said objective lens and said concave surface of said substantially hemispherical section of said dome window being independent of the swiveling about the tilt axis and the pan axis.

20. The camera assembly of claim 17 wherein said camera is configured to swivel about a pan axis having an intersection with the tilt axis, the intersection being substantially equidistant from substantially all points on the concave surface of said substantially hemispherical section of said dome window.

21. The camera assembly of claim 17 wherein said dome window is unitary.

22. The camera assembly of claim 17 wherein said camera is configured to swivel about a pan axis substantially perpendicular to the tilt axis, a line of sight of said camera remaining substantially normal to said substantially hemispherical section of said dome window at an intersection of the line of sight and said substantially hemispherical section throughout the swiveling about the tilt axis and the pan axis.

23. The camera assembly of claim 17 wherein said substantially cylindrical section of said dome window comprises a frusto-conical section, said frusto-conical section defining a longitudinal axis, said frusto-conical section being oriented at an angle approximately between 0° and 5° relative to the longitudinal axis.

24. The camera assembly of claim 17 wherein said first annular end of said substantially cylindrical section has a first inner diameter that is greater than a second inner diameter of said second annular end of said substantially hemispherical section.

25. The camera assembly of claim 24 wherein said first annular end of said substantially cylindrical section has a first outer diameter that is greater than a second outer diameter of said second annular end of said substantially hemispherical section.

26. The camera assembly of claim 17 wherein said camera is mountable within said dome window.

27. The camera assembly of claim 17 further comprising a mounting apparatus, said camera being mounted to said mounting apparatus.

28. The camera assembly of claim 27 wherein said dome window is coupled to said mounting apparatus.

29. The camera assembly of claim 28 wherein said substantially cylindrical section of said dome window defines a longitudinal direction, said mounting apparatus including a plurality of fins arranged around a perimeter of said substantially cylindrical section, each of said fins being oriented radially and parallel relative to the longitudinal direction.

30. The camera assembly of claim 27 wherein said dome window includes a flange coupled to said mounting apparatus.

31. The camera assembly of claim 17 wherein said substantially cylindrical section defines a longitudinal direction, said camera including an objective lens, the tilt axis of said camera being offset from a geometric center of said substantially hemispherical section by a distance equal to approximately one-half of a diameter of said objective lens.

32. The camera assembly of claim 1 wherein said substantially cylindrical section and said substantially hemispherical section are separately formed.

33. The camera assembly of claim 17 wherein said substantially cylindrical section and said substantially hemispherical section are separately formed.

34. A surveillance camera assembly, comprising:

a dome window including:

a substantially cylindrical section having an inner surface and a first annular end;

a substantially hemispherical section having a concave surface and a second annular end, said second annular end being joined to said first annular end of said substantially cylindrical section, said concave surface and said inner surface of said substantially cylindrical section conjointly defining a cavity, both said substantially cylindrical section and said substantially hemispherical section being substantially transparent when viewing outwardly from a position within said cavity; and a covert liner disposed adjacent said inner surface of said substantially cylindrical section and said concave surface of said substantially hemispherical section of said dome window, said covert liner including a substantially hemispherical section with disposed within said substantially hemispherical section of said dome window, and a substantially cylindrical section disposed within said substantially cylindrical section of said dome window, said covert liner including a throughslot having a first width in said hemispherical section of said covert liner and a second width in said cylindrical section of said covert liner, at least a portion of said second width greater than said first width; and a surveillance camera received in the cavity of said dome window and configured to swivel relative to said dome window and to view through said throughslot and each of said substantially hemispherical and substantially cylindrical sections of said dome window.

* * * * *